Patented Oct. 3, 1933

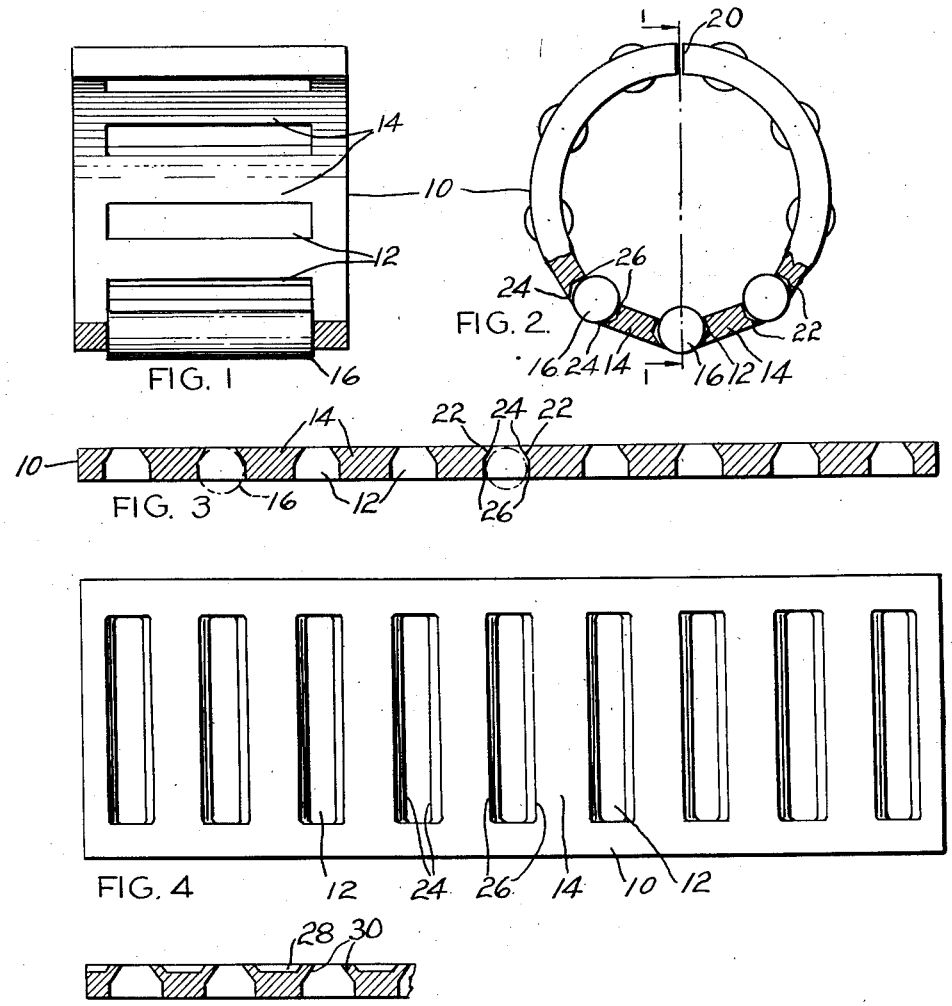

1,928,823

UNITED STATES PATENT OFFICE 1,928,823

ANTIFRICTION BEARING CAGE AND METHOD

Otto W. Young, East Orange, N. J., assignor to General Motors Corporation, Detroit, Mich., a corporation of Delaware Application July 18, 1929. Serial No. 379,178

4 Claims. (Cl. 29—148.4)

This invention relates to antifriction bearing cages and methods and comprises all the features and aspects of novelty herein disclosed.

An object of the invention is to provide an improved cage of simple construction and low cost. Another object is to provide a cage having pockets which retain the rolling elements and wherein the pockets are closed without individual operations and merely as an incident to the general formation of the cage. Another object is to provide a one-piece roller retaining cage capable of easy manufacture from sheet metal and wherein the roller retaining pockets have no bendable holding tabs projecting from the cage body. Another object is to provide an improved method of making a cage and assembling rolling elements therein.

To these ends and to improve generally upon devices and method of this character, the invention further consists in the various matters hereinafter disclosed and claimed.

In its broader aspects, the invention is not necessarily limited to the specific constructions and steps selected for illustrative purposes in the accompanying drawing in which Fig. 1 is a transverse section on line 1—1 of Fig. 2, some rollers being omitted.

Fig. 2 is a side view of the cage, partly in section.

Fig. 3 is a longitudinal section of the cage blank.

Fig. 4 is a plan view of one side of the blank and

Fig. 5 is a sectional view of a modification.

The numeral 10 indicates the body of the cage or separator which is bent from a plain and uniformly thick strip of stiff sheet metal having a series of roller openings or pockets 12 alternating with cross bars 14. The opposing edges of the openings guide and retain rolling elements 16, herein shown as straight cylindrical rollers. The case body is bent into arcuate form to form a split tube or sleeve having its ends in abutting or closely adjacent relation as indicated at 20 in Fig. 2.

The roller openings or pockets 12 are conveniently cut or punched when the strip is in the flat condition. The opposing walls of the openings preferably converge as at 22 or are otherwise shaped so that, on one side of the strip, the opposing edges 24 are closer together than the opposing edges 26 on the other side. The opposing edges 24 at each opening approach one another to a distance materially less than the diameter of the rolling elements 16 so that the rolling elements cannot pass through even if the strip is stretched or expanded to the amount required when bending the strip into a cylindrical sleeve. The opposing edges 26 of each opening of the strip are initially spaced apart a slightly greater distance than the diameter of the rolling elements so that the latter can be freely inserted transversely into the openings before final bending of the strip. This last distance, however, is so nearly that of the roller diameter that a curling of the strip into arcuate form, with the edges 26 on the interior of the curve, as indicated in Fig. 2, will so contract the inner wall of the bent strip as to cause the opposing edges 26 of each opening to approach one another to a distance less than roller diameter. The rolling elements are thus retained against escape inwardly as well as outwardly and the sleeve is stiff enough to retain its shape and that of the openings or pockets.

No individual closing operations on the pockets are required after inserting the rolling elements and all of them become closed as a mere incident to final shaping of the cage. The edges of the cross bars themselves retain the rolling elements and these edges terminate within the uniform cross sectional area of the sleeve so that there are no loose projecting holding tabs or fingers subject to bending, either intentionally and initially to hold the rolling elements or accidentally after being so bent.

Fig. 3 shows the converging surfaces 22 of the openings as they could be conveniently formed by a punching or dieing operation on the strip. Fig. 5 shows an alternative method of making the openings converge, the material being swaged or punched by suitable dies which simultaneously form the depressions 28 and the converging walls 30.

I claim:

1. The method of making a retaining cage for an arcuate series of rolling elements which consists in cutting openings in a thick strip of stiff sheet material, the openings being narrower at one side of the strip than at the other, the opposing edges of each narrow opening being spaced apart a less distance than the diameter of the rolling elements and the opposing edges of each wider opening being spaced apart a slightly greater distance than the diameter of the rolling elements, inserting rolling elements through the wider openings, and bending the strip into arcuate form with the side having the wider openings at the inside to contract said wider openings to a width less than the diameter of the rolling elements; substantially as described.

2. The method of making a cage for an arcuate series of rolling elements which consists in cutting converging openings in a strip of sheet material, inserting rolling elements from one side of the strip into the openings, the edges of the openings at the other side of the strip retaining the rolling elements from passing through the strip, and bending the strip into arcuate form to contract the side through which the rollers are passed and thereby causing the edges of the openings at said last side to approach within a less distance than the diameter of the rolling elements; substantially as described.

3. An antifriction cage element comprising a plain strip of sheet material of substantially uniform thickness with a series of rolling element openings separated by cross bars, the opposing edges of each opening at one side of the strip being spaced apart a distance less than the diameter of the rolling elements, the edges of each opening at the other side of the strip being spaced apart a distance greater than the diameter of the rolling elements, said distances and the length of the strip being so related that bending of the strip into circular shape will not expand the first distance to more than the diameter of the rolling element and will contract the first distance to less than the diameter of the rolling elements; substantially as described.

4. The method of making a cage for an arcuate series of rolling elements which consists in forming openings in a plain and uniformly thick strip of material, bending the strip into substantially circular form, the edges of the openings at that side of the unbent strip which becomes the inside of the curve being initially spaced apart a distance greater than the diameter of the rolling elements, said distance and the length of the strip being so related that the bending of the strip into circular form will contract the distance to less than the diameter of the rolling elements to hold the latter from escaping inwardly of the cage, the edges of the openings at that side of the strip which becomes the outside of the curve also being spaced apart, when the cage is completed, a distance less than the diameter of the rolling elements to hold the latter from escaping outwardly of the cage, and inserting rolling elements in the openings prior to completion of the cage; substantially as described.

OTTO W. YOUNG.